United States Patent [19]

Togo et al.

[11] 4,028,604

[45] June 7, 1977

[54] SERVO-MOTOR CONTROL SYSTEM

[75] Inventors: Masaaki Togo, Kawasaki; Masao Shima, Tokyo; Kiyoshi Mochizuki, Kamakura, all of Japan

[73] Assignee: Yamatake-Honeywell Company Limited, Tokyo, Japan

[22] Filed: June 25, 1975

[21] Appl. No.: 590,209

[30] Foreign Application Priority Data

July 9, 1974    Japan .............................. 49-75385

[52] U.S. Cl. ................................ 318/596; 318/466; 318/685
[51] Int. Cl.² .................. H02K 37/00; G05B 11/18
[58] Field of Search .......... 318/685, 466, 596, 604, 318/664

[56] References Cited

UNITED STATES PATENTS

| | | | |
|---|---|---|---|
| 3,399,753 | 9/1968 | Revelle | 318/685 X |
| 3,465,217 | 9/1969 | Kress | 318/685 X |
| 3,864,615 | 2/1975 | Williams | 318/685 X |
| 3,934,187 | 1/1976 | Trotel | 318/685 X |

Primary Examiner—B. Dobeck
Attorney, Agent, or Firm—Laurence J. Marhoefer; Lockwood D. Burton

[57] ABSTRACT

A servo-motor control system varies a set point input signal to a comparator between predetermined limits in order to establish three detectable output conditions. When the difference between the feedback signal and the set point signal exceeds the average deviation of the set point input to the comparator, the comparator produces a characteristic output signaling rotation in one direction. When this difference signal is less than a negative quantity equal to the average deviation, the comparator produces a characteristic output which signals rotation in the other direction. If the difference signal is less than the absolute average value, then a third characteristic output is produced which causes a cutoff in the energization of the motor.

6 Claims, 7 Drawing Figures

FIG. 3B  $\varepsilon < \frac{\Delta V_{SP}}{2}$

FIG. 3C  $\varepsilon > \frac{\Delta V_{SP}}{2}$

FIG. 3D  $\varepsilon < \frac{\Delta V_{SP}}{2}$

SERVO-MOTOR CONTROL SYSTEM

BACKGROUND OF THE INVENTION

1. Field of the Invention

This invention relates to an improved servo-motor control system and, more particularly, to an improved system for controlling a stepping motor in order to conserve energy when the motor is in its equilibrium position.

2. Description of the Prior Art

In the field of analog servo systems, heretofore, a d.c. servo-motor of the so-called stepping motor type has been driven in response to a signal which corresponds to an analog differential input. Such systems have obtained good reputations because of their simplified construction and high reliability, particularly when used in combination with contactless d.c. motors. Such systems are also widely used, in part, because of the rotor of the motor which can hold its position at a predetermined angular position.

FIG. 1 is a block diagram showing a typical prior art circuit for driving a servo-motor. In the figure, reference numeral 1 designates a stepping servo-motor capable of bi-directional rotation, numeral 2 a differential amplifier, numeral 3 an input terminal to which an analog signal is applied, numeral 4 an oscillator which transmits one or another of two pulse trains upon the receipt of the output of said differential amplifier 2, and numeral 5 represents an energization circuit which includes a plurality of bi-stable circuits. The rotational direction of the motor is determined by which one of the two pulse trains is transmitted from oscillator 4.

The rotor of servo-motor 1 rotates through a predetermined angle upon receipt of each pulse of a pulse train for forward or backward rotation from the pulse transmitter 4 and stops rotating when pulse signals are stopped. The rotor is then held in the balanced position which is established last owing to the magnetic forces between the motor rotor and stator.

However, the stepping servo-motor in such prior art constructions are always connected to the power source regardless of whether it is stepping, or in a balanced condition; thus, the power consumed is considerable and the temperature of the motor itself can become excessively elevated as well as parts other than the motor, for instance, the electronic circuits.

Generally, it is rare for such a servo-motor to step continuously. Typically, such motors remain in a balance position for long intervals, particularly in applications of such servo-motors to analog instruments or the like. In such application, however, a load for the servo-motor, for example a slide type variable resistor, often provides a holding function which tends to maintain the motor in its balanced position. In addition, the permanent magnet in the rotor of the servo-motor also provides a holding force to some extent. Consequently, the balance position of the motor in such applications can be maintained even if the power supply for energizing the motor is cutoff.

In the prior art, accordingly, the points mentioned above have been considered and utilized; that is, the prior art has proposed a method in which the servo-motor is energized for a predetermined period in accordance with trigger pulses while the power is always in a cutoff condition for periods other than the above predetermined period. In addition, there has been a proposal for another method in which a comparator has an insensitive or dead zone which functions to cutoff the power for energizing the servo-motor through the operation of a switch circuit when an input error signal is below a predetermined level. However, these prior art proposals encounter certain difficulties in their implementaion; for example, specific one-shot type multivibrator circuits or the comparator having insensitive zone is required.

SUMMARY OF THE INVENTION

Accordingly, an object of this invention is to provide an efficient system for driving a stepping servo-motor which can be easily and reliably implemented.

A servo-motor control system of this invention contemplates varying a set point input signal to a comparator between predetermined limits in order to establish three detectable output conditions. So long as the difference between the feedback signal and the set point signal exceeds the average deviation of the set point input to comparator, the comparator produces a characteristic output signaling rotation in one direction. When this difference signal is less than a negative quantity equal to the average deviation, the comparator produces a characteristic output which signals rotation in the other direction. If the difference signal is less than the absolute average value, then a third characteristic output is produced which causes a cutoff in the energization of the motor.

BRIEF DESCRIPTION OF THE DRAWINGS

Other objects and merits of this invention will be more fully understood from the following description taken in conjunction with the accompanying drawings in which:

FIG. 3B is a diagram showing a relationship in which the value of the set input minus the feedback input is greater than the average set point voltage;

FIG. 3C is a diagram representative of the conditons when the set input signal minus the feedback input signal is greater than the average set point voltage variation;

FIG. 3D is a diagram representative of the conditions which exist when the set input minus the feedback voltage is less than the average variation of the set point voltage but of opposite polarity to that shown in FIG. 3B

DETAILED DESCRIPTION OF THE PREFERRED EMBODIMENT

Figure 1:
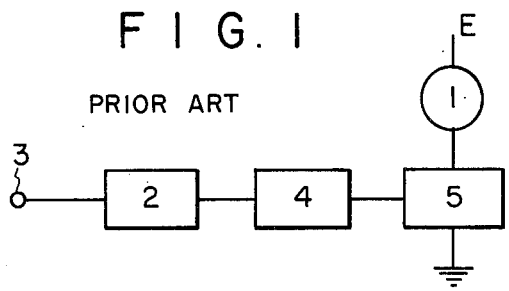
FIG. 1 is a block diagram of a prior art system.
Figure 2:
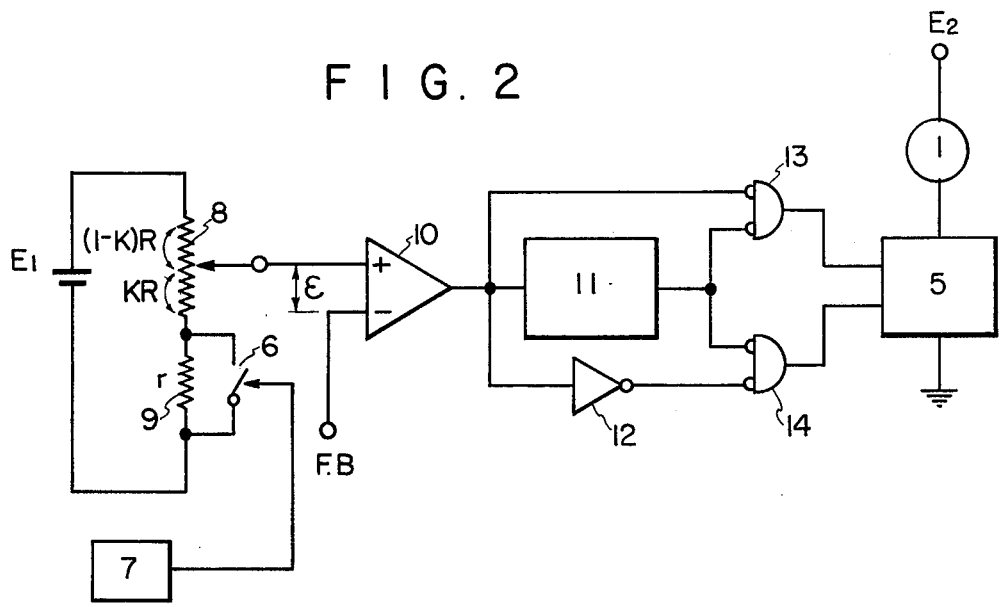
FIG. 2 is a diagrammatical representation showing a circuit for driving the servo-motor in accordance with the present invention.

Referring now to FIG. 2, a reference numeral 6 designates a switching element which is shown schematically in the drawing; it will be appreciated that this switch, in the actual practice of the invention, may be a semiconductor switch or other suitable switch known in the art. An oscillator 7 operates the switch 6 to open and close it for constant, predetermined periods.

A variable registor 8, having value R, is connected in series with a fixed resistor 9, having value r. Resistor 9 is connected in parallel with said switching element 6.

One input of a comparator 10 is coupled to the variable resistor 8 and its other input is coupled to a feedback potential whose magnitude may be, for example, a function of state of an element controlled by the motor. The output of comparator 10 is coupled to a retriggerable mono-multi 11 (called mono-multi hereinafter) which has a time constant (period in which the mono-multi is in its astable state following each triggering signal) larger than the period of the pulses generated by oscillator 7. In addition, the output of comparator 10 is coupled to a NAND gate 13 and, via an inverter 12, to another NAND gate 14. The outputs of NAND gates 13 and 14 determine forward or reverse rotation of the motor, as will be more fully described below.

Now, the operation of the circuit thus far described in detail above will be explained referring to FIG. 3. The switching element 6 is operated in an OPEN-CLOSED fashion by means of the oscillating output of the oscillator 7. As a result of this switching operation, the fixed resistor 9 is repeatedly switched into the circuit (insertion) and out of the same (short). Consequently, the (+) input terminal of the comparator 10 is supplied with the signal having the wave form shown in FIG. 3.

This is to say:

$$V_{sp}1 = \frac{kR}{R+r} E \quad \text{(insertion of fixed resistor 9)}$$

$$V_{sp}2 = \frac{kR}{R} E = kE \quad \text{(short of fixed resistor 9)}$$

therefore, $$\Delta V_{sp} = V_{sp}2 - V_{sp}1 = \frac{kr}{R+r} E$$

The comparator 10 may be so biased that it saturates, assuming a high output (logic 1) state when the differential input (set value minus feedback) is greater than $\Delta^V sp/2$, and it cuts off, assuming a low output (logic 0) state when $\epsilon$ is less than $\Delta^V sp/2$. When $|\epsilon|$ is less than $\Delta^V sp/2$ the output of comparator 10 switches between its high and low states as the set point switches between $V_{sp}1$ and $V_{sp}2$. FIG. 3 illustrates these relationships for the three cases.

When mono-multi 11 is in its stable state, its output is logic 0 and provides an enabling input to NAND gates 13 and 14. When the output of amplifier 10 is logic 1 ($\epsilon>(\Delta^V sp/2)$) both inputs to gate 14 are 0 and this gate produces an output causing clockwise rotation of motor 1, for example. Similarly, a logic 0 output from amplifier 10 ($\epsilon<-(\Delta^V sp/2)$) enables gate 13 and produces counter-clockwise rotation.

A pulse output from comparator 10 ($|\epsilon|<(\Delta^V sp/2)$) triggers continuously the mono-multi 11, the output of which becomes logic 1 and holds the high level condition to close the gate of the NAND circuits 13 and 14. Thereby, the energization circuit 5 is passivated to cutoff the power for energizing the servo-motor 1.

Figure 4:
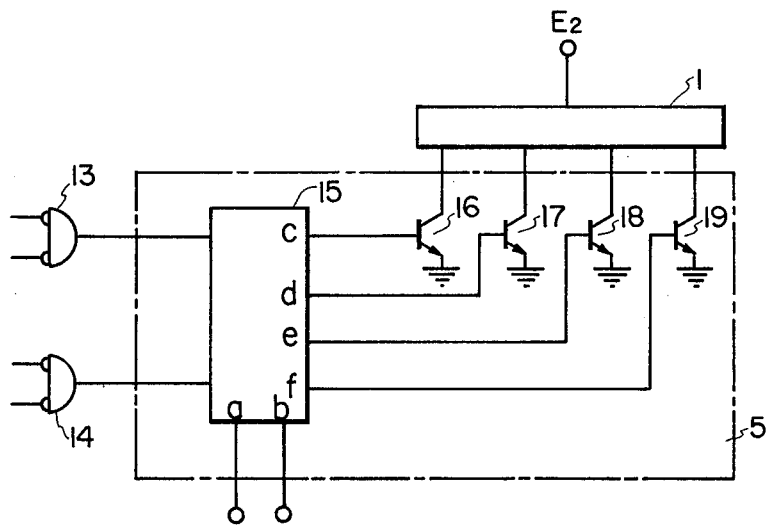
FIG. 4 is a schematic drawing showing details of the motor energizing circuit of FIG. 2.
Figure 3A:
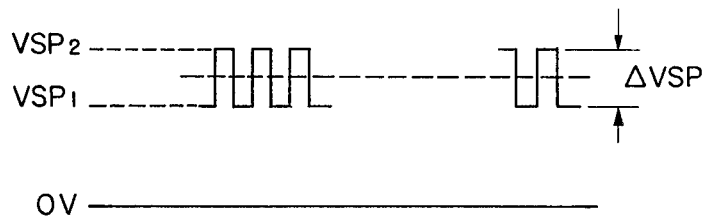
FIG. 3A is a diagram illustrating the continuously varying set point voltage.
Figure 3A:
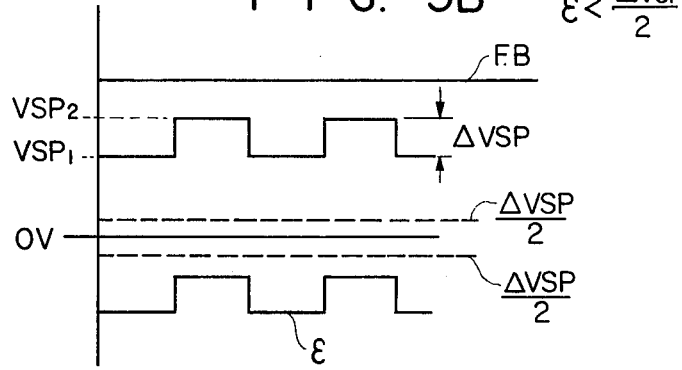
Figure 3A:
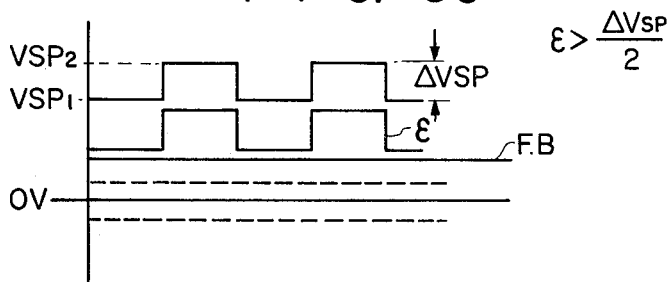
Figure 3A:
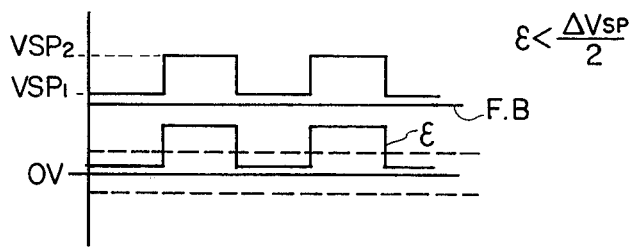

One example of the energization circuit 5 embodying the present invention is shown in FIG. 4. In this figure, the switching circuit 15 receives outputs from NAND gates 13 and 14, and also receives at its terminals a and b pulses pulses or sine wave signals which are different by 180° in phase from each other, as is conventional in the stepping motor art. In accordance with the combination of the output conditions of NAND circuits 13 and 14, the outputs of the switching circuit 15 are obtained at the terminals c, d, e, and f as pulses, for example. These outputs drive or cutoff the transistor switches 16 thru 19 in order to sequentially energize the appropriate coils of the servo-motor 1 from $E_2$ to control the rotation of the servo-motor in forward or reverse direction. In the equilibrium condition for the motor, there is no output from gate 13 or 14 and source $E_2$ is disconnected from the coils.

The embodiments of the invention in which an exclusive property or privilege is claimed are defined as follows:

1. A servo-motor control system for driving a servo-motor in an analog servo-system comprising in combination:
    a comparator circuit having two input means and an output means;
    means for generating a set point signal which periodically and continuously varies between predetermined limits;
    means for coupling said set point signal generator to one input means of said comparator;
    means for coupling a feedback signal to the other input means of the comparator;
    means for energizing said servo-motor;
    means responsive to the output of said comparator for coupling said energizing means to said motor;
    said responsive means coupling said energizing means to said motor for rotation in one direction when the difference between the feedback signal and the set point signal exceeds a predetermined percentage of the variation of the set point input to the comparator;
    said responsive means coupling said energizing means to said motor for rotation in the opposite direction when the difference between the set point signal and the feedback signal is less than a negative quantity equal to a predetermined percentage of the variation of the set point signal; and
    said responsive means disconnecting said energizing means from said motor when the difference between said set point signal and said feedback signal is less than a predetermined percentage of the variation in the set point signal.

2. A servo-motor control system for driving a servo-motor in an analog servo-system as defined in claim 1 wherein said predetermined value is the average value of said variation.

3. A servo motor control system for driving a servo-motor in an analog servo-system as defined in claim 1 wherein said coupling means includes a retriggerable mono-multi.

4. A servo motor control system for driving a servo-motor in an analog servo-system as defined in claim 2 wherein said coupling means includes a retriggerable mono-multi.

5. A servo-motor control system for driving a servo-motor in an analog servo-system as defined in claim 1 wherein said means for generating a set point signal includes means for generating a constant d.c. voltage upon which said periodically and continuously varying signal rides.

6. A servo-motor control system for driving a servo-motor in an analog servo system as defined in claim 2 wherein said means for generating a set point signal includes means for generating a constant d.c. voltage upon which said periodically and continuously varying signal rides.

* * * * *